OR 3,591,252

United States [11] 3,591,252

| [72] | Inventor | Sun Lu<br>Dallas, Tex. |
| [21] | Appl. No. | 769,103 |
| [22] | Filed | Oct. 21, 1968 |
| [45] | Patented | July 6, 1971 |
| [73] | Assignee | Texas Instruments Incorporated<br>Dallas, Tex. |

[54] LARGE ARRAY SYNTHESIZING
7 Claims, 3 Drawing Figs.
[52] U.S. Cl. .................................................. 350/3.5,
96/36.2, 350/162 SF
[51] Int. Cl. ...................................................... G02b 27/00
[50] Field of Search .......................................... 350/3.5,
162; 96/36.2; 355/2

[56] References Cited
UNITED STATES PATENTS
3,405,614  10/1968  Lin et al. ...................... 350/3.5
OTHER REFERENCES
Gabor et al., PHYSICS LETTERS, Vol 18, No. 2, Aug 1965 pp. 116– 118 (copy in 350/3.5)
Sroke et al., PROC. OF THE IEEE, Jan., 1967 pp. 109– 111 (copy in 350/3.5)

Primary Examiner—John K. Corbin
Assistant Examiner—Ronald J. Stern
Attorneys—Samuel M. Mims, Jr., James O. Dixon, Andrew M. Hassell, Levine, Harold, Melvin Sharp and Richards, Harris and Hubbard ABSTRACT: An array of similar images may be synthesized by holographic reconstruction techniques. To produce a large array of similar images, a hologram is constructed that contains the spatial frequency spectrum of the desired array. This frequency spectrum may be generated by usual holographic procedures wherein an object wave and a reference wave are made to interfere on an energy sensitive surface. Since the information contained on the hologram represents an array of points which synthesizes the spatial frequency spectrum, the hologram must be produced by sequentially exposing the energy sensitive surface to a series of interference patterns. To control the amplitude and phase distribution of each point representing the spatial frequency spectrum, both the exposure time and phase displacement between the interfering beams are uniquely determined from a mathematical model of the spatial frequency spectrum.

INVENTOR:
SUN LU
ATTORNEY

LARGE ARRAY SYNTHESIZING

This invention relates to image array synthesis, and more particularly, to the synthesizing of a large array of similar images by synthesizing the spatial frequency spectrum with an array of points.

Heretofore, the highest quality patterns of large arrays of identical images are produced by elaborate step-and-repeat cameras with lenses of high aperture to give the necessary resolving power. With the step-and-repeat camera, a multiple image mask is constructed from a master image and the image pattern transferred to a photographic plate by the process of contact printing. To produce a 30-by-30 array on a mask, it is necessary to perform 900 exposures through the master image. For each of the 900 exposures, the master image must be positioned accurately within 0.0001 of an inch. Although the step-and-repeat camera produces the best result of previously available systems, it is a tedious, time consuming, and expensive way to produce large arrays of identical images.

Another system for producing multiple images is the pinhole array camera. A pinhole array camera system consists of a mask having an array of precisely positioned, uniform diameter apertures. The resolution of the images formed by this system is controlled by the aperture size and the pinhole array to mask distance. Since the effective lens quality of a pinhole opening is very poor, the images produced by this method are of a lower quality than the step-and-repeat camera system. However, the pinhole array camera system is relatively simple and inexpensive.

In accordance with the present invention, a large array of identical images is produced from an array of point sources on a spatial frequency plane by holographic reconstruction techniques. These point sources represent the spatial frequency spectrum of the array of identical images which, when placed in a reconstruction wave, produces the Fraunhofer diffraction pattern, or the Fourier transform, to thereby form the large array of identical images. The point source array is synthesized from a series of sequentially produced interference patterns on an energy sensitive surface.

In accordance with a more specific embodiment of this invention, a large array of identical images is produced by generating the diffraction pattern of an array of point sources represented by interference patterns on a hologram. To construct the hologram, an object beam interferes with a reference wave in a photographic emulsion. Each point source on the hologram requires the generation of an interference pattern between the two interfering beams to uniquely determine its amplitude and phase distribution with relation to other point sources. The amplitude and phase distribution of each point source may be controlled by varying the exposure time of the photographic emulsion and the phase difference between the two interfering beams. A mathematical model of the image arrangement is calculated to determine the exposure time and phase difference.

To produce a hologram of an array of point sources representing the spatial frequency spectrum of an array of identical images, the light wave from a monochromatic source is split by a beam splitter into an object wave and a reference wave. After passing through a beam expander and a collimating lens, the reference wave is directed to a photographic emulsion in which a series of interference patterns will be produced. The object wave is made to interfere with the reference wave at the photographic emulsion after passing through a phase control cell, a beam expander, a collimating lens and a focusing lens. To produce the desired pattern of point sources, the position of the object beam is changed for each interference pattern.

An object of the present invention is to produce an array of identical images in a single step. Another object of this invention is to produce an array of identical images from the spatial frequency spectrum of the image array. A further object of this invention is to produce an array of identical images by synthesizing its spatial frequency spectrum with an array of point sources. Still another object of this invention is to produce an array of identical images by holographic reconstruction of a diffraction pattern of the array.

A more complete understanding of the invention and its advantages will be apparent from the specification and claims and from the accompanying drawings illustrative of the invention.

Referring to the Drawings.

Figure 1:
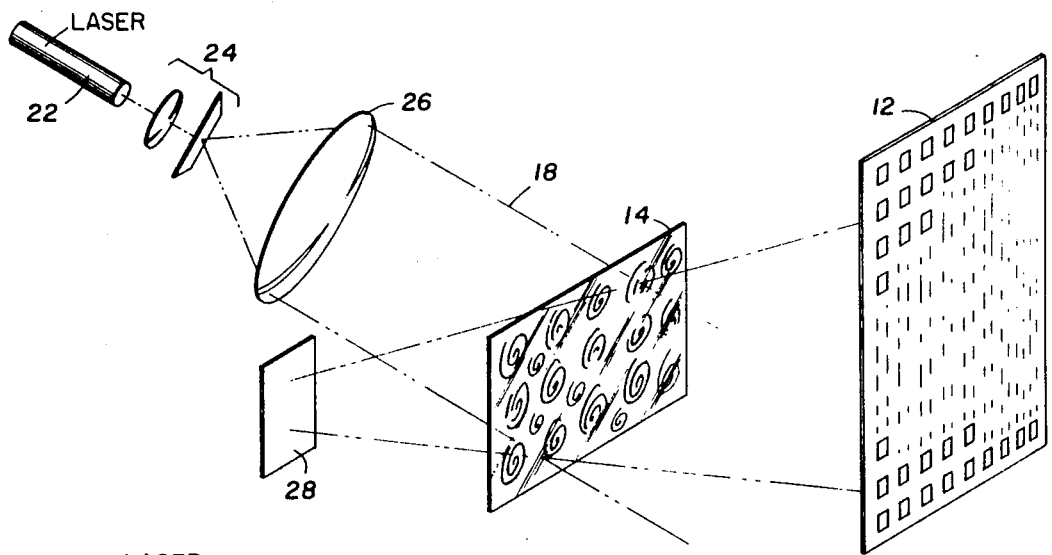
FIG. 1 is a schematic of a system for producing an array of identical equally spaced images from a hologram containing an array of point sources representing a spatial frequency spectrum.

Referring to FIG. 1, there is shown a system for producing an array of identical images similarly spaced on a screen 12 by means of light waves 18 passing through a screen 14 (a hologram) containing the diffraction pattern of the image array. The screen 14 is illuminated from a source of monochromatic coherent light 22, for example, a helium-neon laser. Light waves from the laser 22 are expanded in an expander 24 and collimated by a lens 26.

Some of the collimated coherent light waves 18 pass through the screen 14 undisturbed; however, a sufficient amount of the light waves reconstructs on the surface 28 a virtual image which is the spatial frequency spectrum of the desired image array. The far-field diffraction on the screen 12 is then the desired image array which in the present case is an array of identical squares similarly placed.

Figure 2:
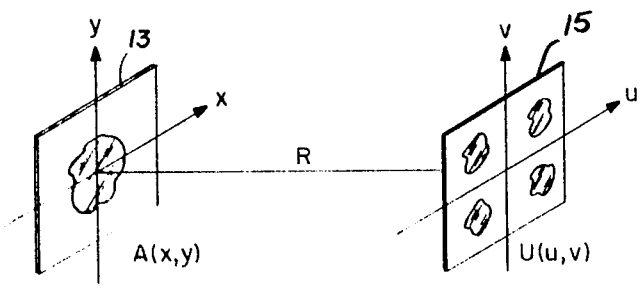
FIG. 2 is a sketch illustrating a basic principle of light wave diffraction as employed in the present invention.

In operation, it has been shown and rigorously proven that the Fraunhofer diffraction pattern produced by passing a light wave through a screen containing a large number of identical and similarly oriented images is a set of similarly situated points. It has also been established that the reverse procedure is true, that is, the Fraunhofer diffraction pattern produced by passing a light wave through a screen of discretely located points representing a diffraction pattern results in the original pattern of a large number of identical and similarly oriented images. In theory, the Fraunhofer diffraction of an image is mathematically related to the image transmission function by a relation known as the Fourier transform. Referring to FIG. 2, if $A(x,y)$ is the optical disturbance leaving the image 11 on a screen 13 in the $x,y$-plane, then the Fraunhofer diffraction pattern of this image on a screen 15 in the $u,v$-plane at a distance R is given by:

$$U(u, v) = c \int_{-\infty}^{\infty} \int_{-\infty}^{\infty} A(x, y) e^{-ik(xu+yv)/R} dx dy \quad (1)$$

where $c$ is a constant, and $k=2\pi/\lambda$ (the propagation constant). The $u,v$-plane is commonly referred to as the spatial frequency plane and the function $U(u,v)$ is the spatial frequency spectrum of the image 11, having a transmission function $A(x,y,)$.

If instead of passing a light wave through the $x,y$-plane to the $u,v$-plane, a light wave is passed from the $u,v$-plane to the $x,y$-plane the spatial frequency spectrum $U(u,v,)$ will be reverse transformed and the image 11 will be produced on the $x,y$-plane. This is the self-reversing property of Fourier transformation described above. That is, the inverse transform of a Fourier transformation is also a Fourier transformation.

Assume the image 11 on the screen 13 represents an array of regularly spaced images of identical shape and similarly spaced, then the function $A(x,y,)$ is periodic. For an image pattern having the same periodicity along the $x$ and $y$ directions, and letting $f(x,y,)$ represent the transmission function of a single image, then the Fourier transform of the images on the screen 13 may be written as:

$$U(u, v) = cG(u, v) [\Sigma_{pq} \delta(u-pR\lambda/T) \delta(v-qR\lambda/T)] \quad (2)$$

where $$G(u, v) = \int_{-\infty}^{\infty} \int_{-\infty}^{\infty} f(x, y) e^{-ik(xu+yv)/R} dx dy \quad (3)$$

and $\delta(u-pR\lambda/T)$ is a $\delta$-function at
$u=pR\lambda/T$
$T=$the periodicity of the periodic function (the spacing between images in an array),
$\lambda=$the wavelength of a light beam passing through the screen 13, and
$p$ and $q$ are integers.

Physically, the equation (2) represents an infinite array of point sources located at $u=pR\lambda/T$ and $v=qR\lambda/T$ on the screen 15. The function $G(u,v)$ contains the amplitude and phase distribution of the points in the array. Since the screen 13 has a periodic transmission function, its spatial frequency spectrum produced on the screen 15 will be discrete. That is, the spatial frequency spectrum is an array of points on the screen 15 having a spacing between points given by:

$$D=R\lambda/T \text{ or} \quad (4)$$
$$DT=R\lambda. \quad (5)$$

By properly selecting a $U(u,v)$ function (or its equivalent, a $G(u,v)$ function,) it is possible to produce a large array of identical images similarly spaced on the screen 12 of FIG. 1. It is only necessary to produce a discrete spatial frequency spectrum having a transmission function $G(u,v)$. The images can be produced from this spatial frequency spectrum by optical Fourier transformation.

It is well known that a hologram can record a plurality of object waves in a time sequence such that the reconstructed wave front is the coherent addition of all the object wave fronts. Assume that the reconstructed wave front is given by the equation (only a single variable function will be described to simplify the description):

$$O(x) = \sum_{p=1}^{n} (t_p e^{i\alpha_p}) A'_p(x) e^{i\phi_p(x)} \quad (6)$$

where $A'_p(x)e^{i\phi_p(x)} =$ the amplitude of the $p$th object wave,
$t_p =$ the exposure time for the $p$th object wave,
and $\alpha_p =$ the phase angle of the $p$th object wave.

Equation (6) can be simplified and rewritten such that the equation of the reconstructed wave front is as follows:

$$O(x) = \sum_{p=1}^{n} C_p A'_p(x) e^{i\phi_p(x)} \quad (7)$$

where $C_p = t_p e^{i\phi_p} =$ a complex constant.

Since the function $A(x,y)$ of equation (1) is periodic, it can be expanded into a Fourier series in a manner analogous to an expansion of a periodic electrical energy wave. As is well known to those skilled in electrical engineering theory, a square wave includes the fundamental frequency and all odd harmonics. Although the accuracy of the reproduction of a square wave is dependent upon the number of harmonics combined, the fundamental and third harmonic are usually combined to produce a square wave, or at least a wave that approaches the square wave configuration. In a similar manner, the periodic function $A(x,y)$ can be shown to include a number of optical wave fronts. For purposes of discussion, assume a function of only one variable having a periodicity of $T$; such a function can be written as:

$$W(x) = \sum_{p=-\infty}^{\infty} C_p e^{ip\frac{2\pi}{T}x} \quad (8)$$

where $$C_p = \frac{1}{T} \int_{-T/2}^{T/2} W(x) e^{-ip\frac{2\pi}{T}x}$$

and is the Fourier expansion coefficient. According to optical theory, the term $$e^{ip\frac{2\pi}{T}x}$$

represents a plane wave front propagated at an angle $\theta_p = p\lambda/T$ with respect to the normal surface of a plane intersecting the wave front and $C_p$ is the amplitude and phase of each plane wave front. Now, by letting $$C_p = t_p e^{i\alpha_p} \quad (9)$$

and $$A'_p(x)e^{i\phi_p(x)} = e^{ip\frac{2\pi}{T}x} \quad (10)$$

then equation (8) reduces to equation (7) and the function $O(x)$ can be synthesized by a group of plane waves in a manner analogous to the synthesizing of a square wave of electrical energy by a plurality of sinusoidal waves. Each plane wave can be considered a "harmonic" because they are a harmonic in the Fourier series expansion. Thus, a desired wave front can be synthesized by its frequency components. Although a large array of identical images is quite difficult to generate, the spatial frequency components of the array are much less difficult to produce.

In general, $C_p$ is a complex constant having a definite amplitude and phase angle for the $p$th plane wave. From equations (9) and (10), it can be seen that the amplitude of $C_p$ is achieved by varying the exposure time $t_p$, and the phase angle is obtained by inserting a phase displacement cell in either the reference beam or the object beam in a hologram generating system.

In the above description, a one dimensional spatial frequency spectrum was constructed. Obviously, two-dimensional frequency spectrums can be generated in a similar manner. The function $G(u,v)$ is a two-dimensional function and the above description can be shown to apply with the following equation:

$$W'(u,v) = \sum_{n,m} C_{nm} e^{i2\pi\left(\frac{nu}{a}+\frac{mv}{b}\right)} \quad (11)$$

replacing equation (8) above.

Figure 3:
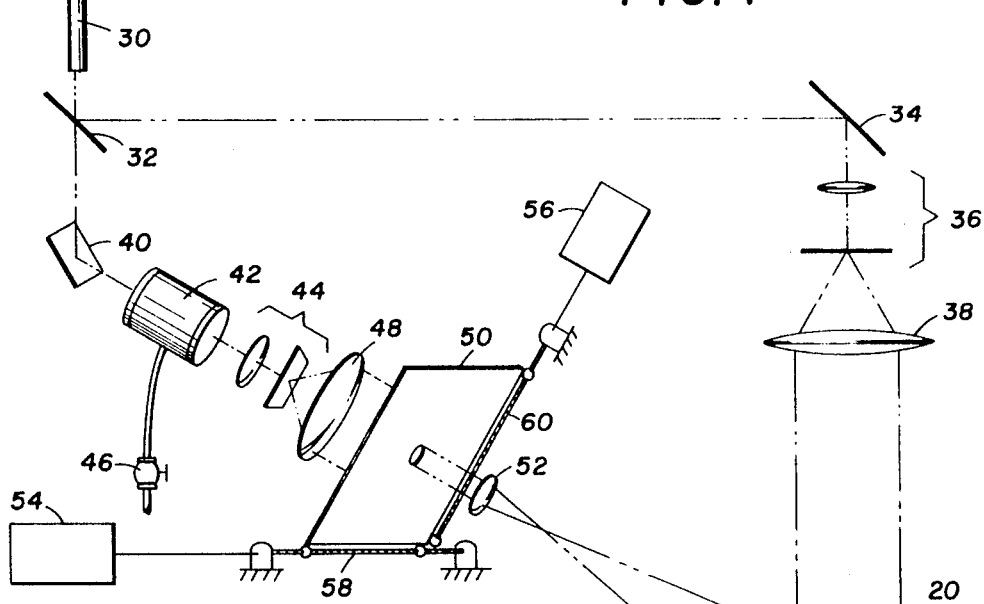
FIG. 3 is a schematic of a system for producing a hologram of an array of point sources.

Referring to FIG. 3, there is shown a system for producing a hologram 20 of a superposition of an aggregation of point sources for synthesizing a spatial frequency spectrum to produce an array of identical images similarly spaced. Holograms have frequently been described as modulated diffraction gratings. In the usual method of formation of a hologram, a diffraction pattern is formed on a photographic plate by the interference of an object wave with a reference wave. The interference pattern on the photographic plate bears no resemblance to any existing object but contains substantially more information than a photograph. To the unaided eye, the interference pattern recorded reveals nothing remotely related to any existing objects. The visible structure of a hologram is purely extraneous and is the result of a somewhat less than perfect light transmitting system.

In FIG. 3, the hologram 20 is produced by multiple exposure of a photographic plate for each harmonic considered necessary to synthesize a desired spatial frequency spectrum to produce an array of identical images similarly spaced on the screen 12. The system includes a laser light source 30 generating a light wave partially reflected by a beam splitter 32 to a reflective surface 34. A light wave reflected from the surface 34 is expanded by a beam expander 36 and collimated by a lens 38.

The collimated light from the lens 38 is identified as the reference wave for generating an interference pattern. Light waves from the lens 38 impinge on the photographic plate on which the hologram 20 is to be recorded. Successful holography depends in large measure upon the use of a photographic plate having a high resolution, such as the Eastman Kodak 649F Spectroscopic plates.

Light waves passing through the beam splitter 32 are transmitted to a reflective surface 40, a phase control cell 42 and pass therefrom to a beam expander 44. In the usual manner, the phase control cell 42 may comprise a cylinder having light transmissive ends and containing a fluid such as air. The pressure of the fluid within the cell 42, as controlled by a valve 46, determines the index of refraction for light passing through and thus introduces a time delay.

Light waves from the expander 44 are collimated by a lens 48 and are directed so as to pass through an aperture provided in a mask 50. Light transmitted through the aperture in the mask 50 passes through a focusing lens 52 and forms an interference pattern with the reference beam on the photographic plate.

As explained previously, an array of point sources is recorded on the plate 20 to form a hologram. These sources may be mathematically located from equation (2). From this mathematical model of the diffraction pattern, the aperture in the mask 50 is positioned to locate each point source. A first computer driven servomotor 54 drives the object (the mask 50 with the aperture therein and the lens 52) along the $u$-axis, Positioning the aperture in the mask 50 and the lens 52 in a desired pattern generates a hologram of the spatial frequency spectrum of an array of identical images similarly spaced.

In many cases of practical multiple image arrays, the $G(u,v)$ function approaches zero very rapidly. This means the intensity of the points far away from the center of the spatial frequency plane are weak and can usually be neglected. Thus, it is only necessary to use a small number of points (discrete frequency components) to synthesize an array of identical images.

In operation, the photographic plate 20 is exposed once for each frequency component required to produce the desired spatial frequency spectrum. For each component, the reference wave is maintained constant and the position of the object wave adjusted by energizing the servomotors coupled to worm drives 58 and 60, respectively. Since the amplitude of the points on the plate 20 drops off very rapidly, only a relatively few points need to be generated. Typically, the amplitude of the point drops off very rapidly from the center point such that more than 90 percent of the light forming the identical image array comes from a central 5 by 5 array of points on the plate 20. The amplitude distribution of the points is achieved by varying the exposure time for each point.

In a practical embodiment of the system of FIG. 1, the screen 12 is a semiconductor wafer and each of the identical images represents a light responsive cell. The semiconductor wafer would be coated with a photo resist emulsion and exposed by light passing through the screen 14. In the usual manner of photomasking techniques, the exposed photo resist is developed and an oxide layer mask formed over the semiconductor substrate. An appropriate dopant is then applied to the substrate to form the individual light cells. Additional detailed description of this well-known technique is not deemed necessary.

While only one embodiment of the invention, together with modifications thereof, has been described in detail herein and shown in the accompanying drawings, it will be evident that various further modifications are possible without departing from the scope of the invention.

What I claim is:

1. A method of producing a relatively large array of images on a display surface by synthesizing the spatial frequency spectrum of said large array with a relatively small array of point sources, comprising the steps of:

determining said synthesized spatial frequency spectrum of said large array of images in accordance with the relationship
$$U(u, v) = cG(u, v)\left[\sum_{pq}\frac{1}{}\delta(u - pR\lambda/T)\delta(v - qR\lambda/T)\right],$$
where
and $G(u, v) = \iint_{-\infty}^{\infty} f(x, y)e^{-ik(xu+yv)/R}dxdy,$ $\delta(v - qR\lambda/T)$ and $\delta(u - pR\lambda/T)$ are $\delta$-functions at
$u = pR\lambda/T$,
$v = qR\lambda/T$, where
$T$ the periodicity of the periodic array,
$\lambda$ = the wavelength,
$p$ and $q$ are integers, and
$R$ is the distance between the surface and the plane of the spatial frequency spectrum
said synthesized spatial frequency spectrum comprising a relatively small array of point sources with respect to said large array of images, each of said point sources having a different spatial position, amplitude and phase angle with respect to the remaining points;

recording said relatively small array of point sources on an energy sensitive surface;

reconstructing an image of said relatively small array of point sources; and forming a diffraction pattern of said reconstructed image, thereby producing said relatively large array of similar images on said display surface.

2. The method of producing a relatively large array of similar images as set forth in claim 1 wherein the step of recording said relatively small array of point sources on an energy sensitive surface comprises the steps of:

generating a first energy wave;

splitting said first energy wave into a reference wave and an object wave;

directing said reference wave to impinge upon said energy sensitive surface;

directing said object wave through a phase cell to control the phase angle between said object wave and said reference wave;

sequentially controlling said phase cell to produce different phase controlled object waves corresponding to the phase angle of respective point sources of said relatively small array of point sources;

directing respective phase controlled object waves to impinge upon a mask having an aperture therein;

controlling the spatial position of said aperture to sequentially produce each point of said relatively small array of point sources; and sequentially controlling the exposure of said energy sensitive surface to respective phase angle controlled and spatial position controlled object waves to produce a series of interference patterns in said energy sensitive surface, said interference patterns respectively having amplitudes corresponding to respective points of said relatively small array of point sources.

3. The method as set forth in claim 2 wherein said energy sensitive surface comprises a photographic emulsion and wherein said energy wave comprises a beam of monochromatic coherent light.

4. The method as set forth in claim 1 wherein the step of reconstructing an image of said relatively small array of point sources comprises:

generating a beam of monochromatic coherent light; and positioning said energy sensitive surface having said interference patterns corresponding to said relatively small array of point sources recorded thereon in said beam to reconstruct an image of said array of point sources thereby producing said synthesized spatial frequency spectrum.

5. Apparatus for producing a relatively large array of similar images by synthesizing the spatial frequency spectrum of said large array with a relatively small array of point sources, comprising in combination:

a source of monochromatic coherent light;

a hologram positioned within said light, said hologram comprising a series of interference patterns, each interference pattern recording the relative phase angle, amplitude and spatial position of a discrete point of said relatively small array of point sources that synthesizes the spatial frequency spectrum of said relatively large array of images, said source of coherent light being operative to reconstruct an image of said relatively small array of point sources; and means for generating the diffraction pattern of said image of said relatively small array of point sources to thereby produce said relatively large array of similar images.

6. Apparatus for producing a relatively large array of images as set forth in claim 5 wherein said means for generating the diffraction pattern of said relatively small array of point sources includes a semiconductor wafer coated with a photoresist emulsion.

7. Apparatus for synthesizing the diffraction pattern of a relatively large array of similar images on an energy sensitive surface comprising:

means for producing a first coherent energy wave;

means for producing a second energy wave having coherence with said first wave and interfering therewith at said energy sensitive surface;

means for varying the exposure time of the energy sensitive surface to the interference pattern of said energy waves to record the amplitude of respective points of said diffraction pattern;

means for varying the phase difference between said energy waves at the energy sensitive surface to record the phase angle of respective points of said diffraction pattern; and means for sequentially positioning one of said energy waves at different locations to sequentially record on said energy sensitive surface each point of said diffraction pattern in a different spatial location.